US011885288B2

(12) United States Patent
Lee et al.

(10) Patent No.: US 11,885,288 B2
(45) Date of Patent: Jan. 30, 2024

(54) FUEL PUMP MODULE FOR VEHICLE

(71) Applicants: HYUNDAI MOTOR COMPANY, Seoul (KR); KIA CORPORATION, Seoul (KR); Hyundam Industrial Co., Ltd., Asan-si (KR)

(72) Inventors: Sung Won Lee, Hwaseong-si (KR); Jung Su Park, Seoul (KR); Seong Cheol Cho, Seoul (KR); Duck Su Moon, Asan-si (KR); Seung Hwan Lee, Cheonan-si (KR)

(73) Assignees: HYUNDAI MOTOR COMPANY, Seoul (KR); KIA CORPORATION, Seoul (KR); HYUNDAM INDUSTRIAL CO., LTD., Asan-si (KR)

( * ) Notice: Subject to any disclaimer, the term of this patent is extended or adjusted under 35 U.S.C. 154(b) by 0 days.

(21) Appl. No.: 17/883,894

(22) Filed: Aug. 9, 2022

(65) Prior Publication Data

US 2023/0054851 A1 Feb. 23, 2023

(30) Foreign Application Priority Data

Aug. 23, 2021 (KR) ........................ 10-2021-0110609

(51) Int. Cl.
*F02M 59/48* (2006.01)
*F02M 59/44* (2006.01)

(52) U.S. Cl.
CPC ............ *F02M 59/48* (2013.01); *F02M 59/44* (2013.01)

(58) Field of Classification Search
CPC ................................ F02M 59/48; F02M 59/44
USPC .......................................................... 123/509
See application file for complete search history.

(56) References Cited

U.S. PATENT DOCUMENTS 4,667,920 A * 5/1987 Kleineberg ............ F02M 37/04 248/68.1
4,750,513 A * 6/1988 Griffin ................. F02M 37/106 137/316
5,394,902 A * 3/1995 Shibao ................. B60K 15/077 137/565.17
5,669,358 A * 9/1997 Osakabe ................ F02M 69/10 123/73 A
6,014,957 A * 1/2000 Robinson ............... F02M 37/10 137/590

(Continued)

FOREIGN PATENT DOCUMENTS

KR 10-2018-0125207 A 11/2018

*Primary Examiner* — Logan M Kraft
*Assistant Examiner* — John D Bailey
(74) *Attorney, Agent, or Firm* — MORGAN, LEWIS & BOCKIUS LLP

(57) ABSTRACT

A fuel pump module for a vehicle, which is formed in a low-floor type fuel pump module capable of being easily installed in a fuel tank with a reduced vertical height. The fuel pump module includes a head plate to be mounted in an opening of a fuel tank, a reservoir cup to which the head plate is pivotably coupled through a pair of connecting bars and which is to be installed in the fuel tank in a state of being coupled to the head plate, a fuel pump disposed in the reservoir cup in a state of being laid and to deliver fuel in the reservoir cup to an outside of the fuel tank, and a jet pump installed in the reservoir cup and to suction fuel outside the reservoir cup and discharge the fuel into the reservoir cup.

16 Claims, 11 Drawing Sheets

(56) References Cited

U.S. PATENT DOCUMENTS

| | | | | | |
|---|---|---|---|---|---|
| 6,206,037 | B1 * | 3/2001 | Murakoshi | F02M 37/106 | 137/565.22 |
| 6,216,734 | B1 * | 4/2001 | Umetsu | F02M 37/103 | 417/363 |
| 6,230,690 | B1 * | 5/2001 | Umetsu | B60K 15/077 | 123/509 |
| 6,260,543 | B1 * | 7/2001 | Chih | F02M 37/106 | 137/574 |
| 6,877,522 | B2 * | 4/2005 | Dasilva | F02M 37/103 | 137/15.01 |
| 7,201,151 | B2 * | 4/2007 | Hayakawa | F04D 13/0666 | 123/509 |
| 7,318,422 | B2 * | 1/2008 | Douyama | F04B 17/03 | 123/495 |
| 7,389,768 | B2 * | 6/2008 | Hayakawa | F02M 37/106 | 137/565.34 |
| 7,556,024 | B2 * | 7/2009 | Crary | F02M 37/103 | 123/495 |
| 8,616,184 | B2 * | 12/2013 | Powell | F04B 23/021 | 123/497 |
| 8,646,480 | B2 * | 2/2014 | Koyama | F02M 37/10 | 137/565.17 |
| 8,701,705 | B2 * | 4/2014 | Park | F02M 37/106 | 137/574 |
| 8,882,472 | B2 * | 11/2014 | Powell | F02M 37/025 | 417/89 |
| 9,752,543 | B2 * | 9/2017 | Ikeya | F02M 37/106 | |
| 10,012,189 | B2 * | 7/2018 | Kondo | F02M 37/10 | |
| 10,704,514 | B2 * | 7/2020 | Kobayashi | F02M 37/00 | |
| 10,753,328 | B2 * | 8/2020 | Murakoshi | F02M 37/103 | |
| 2002/0007825 | A1 * | 1/2002 | Beyer | F04D 29/669 | 417/423.15 |
| 2004/0244780 | A1 * | 12/2004 | Kempka | F02M 37/10 | 137/574 |
| 2005/0155583 | A1 * | 7/2005 | Mitsudou | F02M 37/44 | 123/509 |
| 2006/0016485 | A1 * | 1/2006 | Hayakawa | F04D 13/0666 | 137/565.34 |
| 2006/0070941 | A1 * | 4/2006 | Cline | F02M 37/106 | 137/565.22 |
| 2006/0213486 | A1 * | 9/2006 | Powell | F02M 37/103 | 123/509 |
| 2007/0062493 | A1 * | 3/2007 | Crary | F02M 37/103 | 210/416.4 |
| 2008/0053219 | A1 * | 3/2008 | Ireland | G01F 23/363 | 73/313 |
| 2010/0096533 | A1 * | 4/2010 | Powell | F02M 37/103 | 248/672 |
| 2013/0319549 | A1 * | 12/2013 | Schoenfuss | F02M 37/106 | 137/544 |
| 2014/0116398 | A1 * | 5/2014 | Jeon | F02M 37/106 | 123/509 |
| 2017/0268470 | A1 * | 9/2017 | Murakoshi | F02M 37/103 | |
| 2018/0306151 | A1 * | 10/2018 | Laepple | F02M 59/466 | |
| 2019/0136810 | A1 * | 5/2019 | Niwa | F02M 37/106 | |
| 2021/0025360 | A1 * | 1/2021 | Ito | F02M 37/103 | |
| 2021/0025361 | A1 * | 1/2021 | Ito | F02M 37/10 | |
| 2021/0033051 | A1 * | 2/2021 | Ito | F02M 37/103 | |
| 2021/0115885 | A1 * | 4/2021 | Noguchi | F02M 37/10 | |
| 2022/0213854 | A1 * | 7/2022 | Yoon | F02M 37/103 | |

* cited by examiner

[FIG. 1]
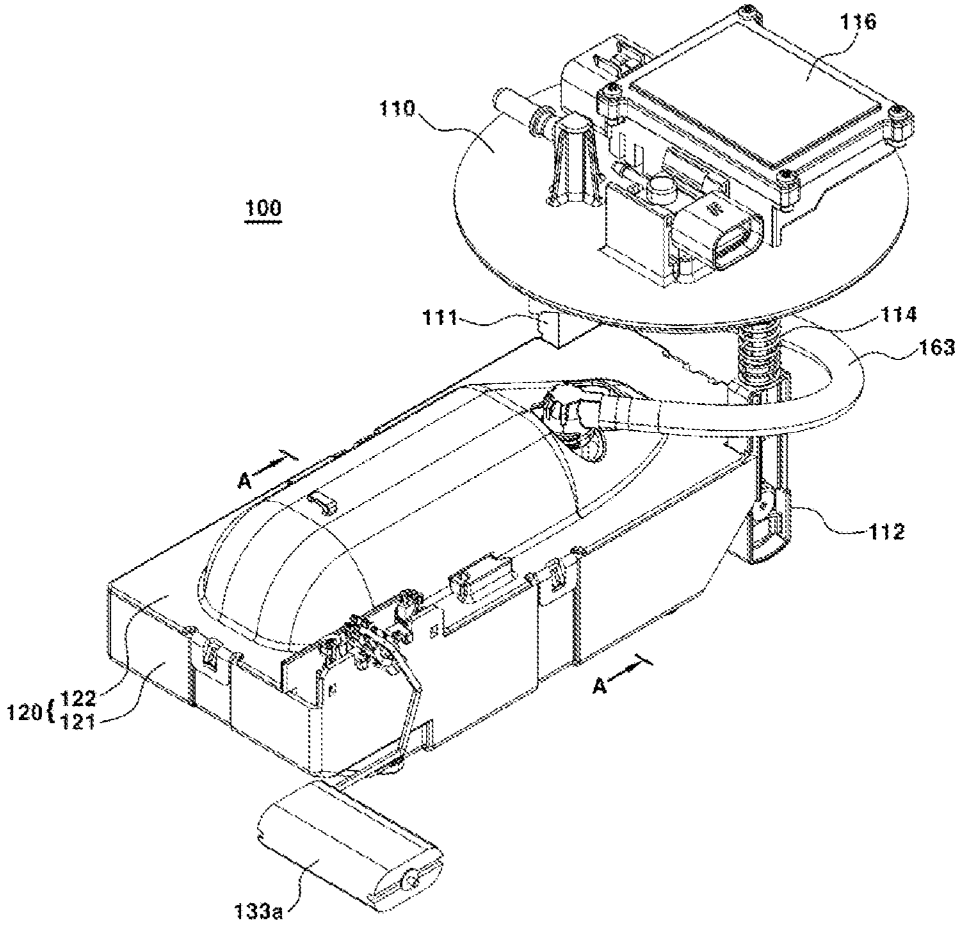

[FIG. 2]
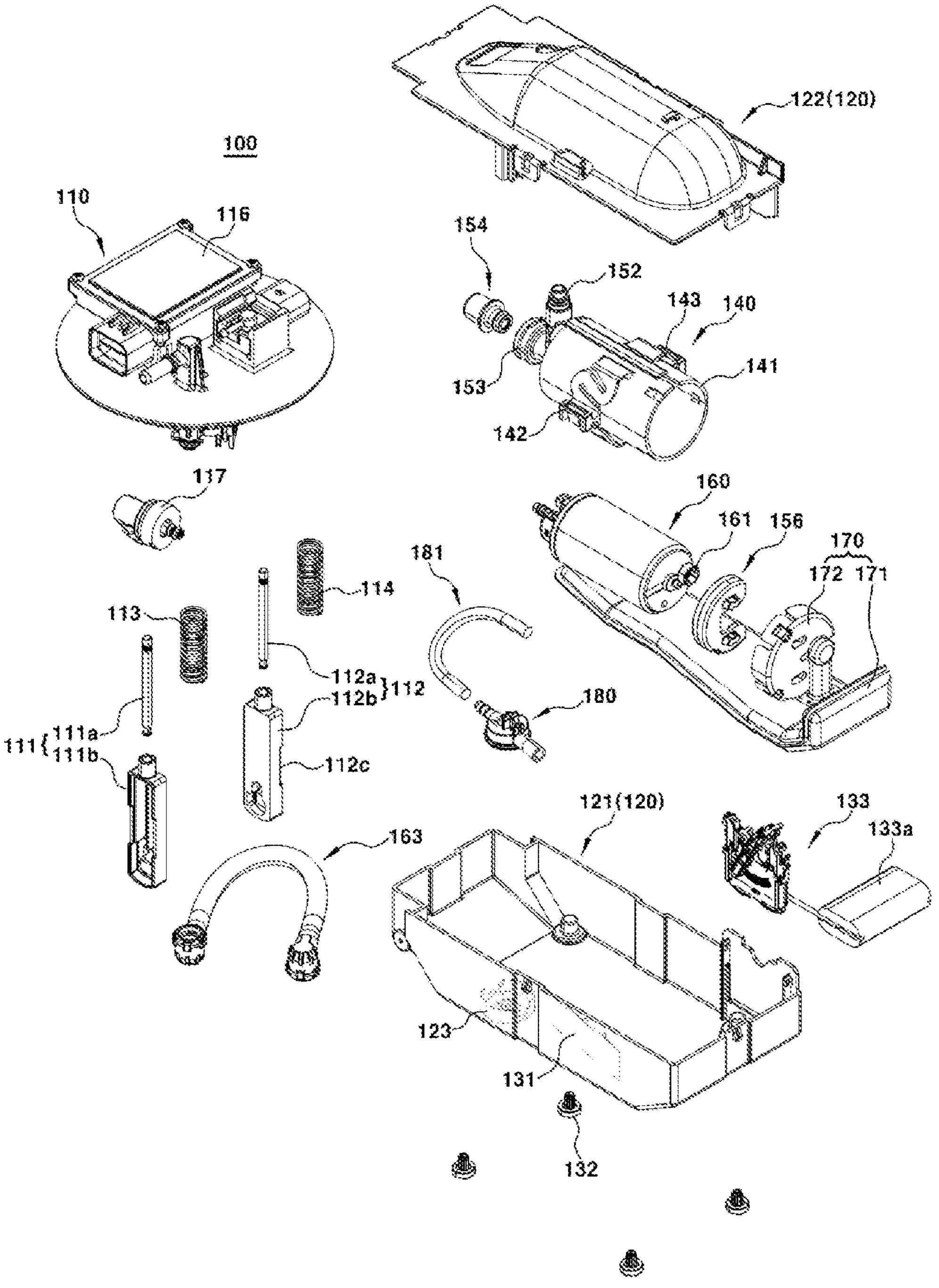

[FIG. 3]
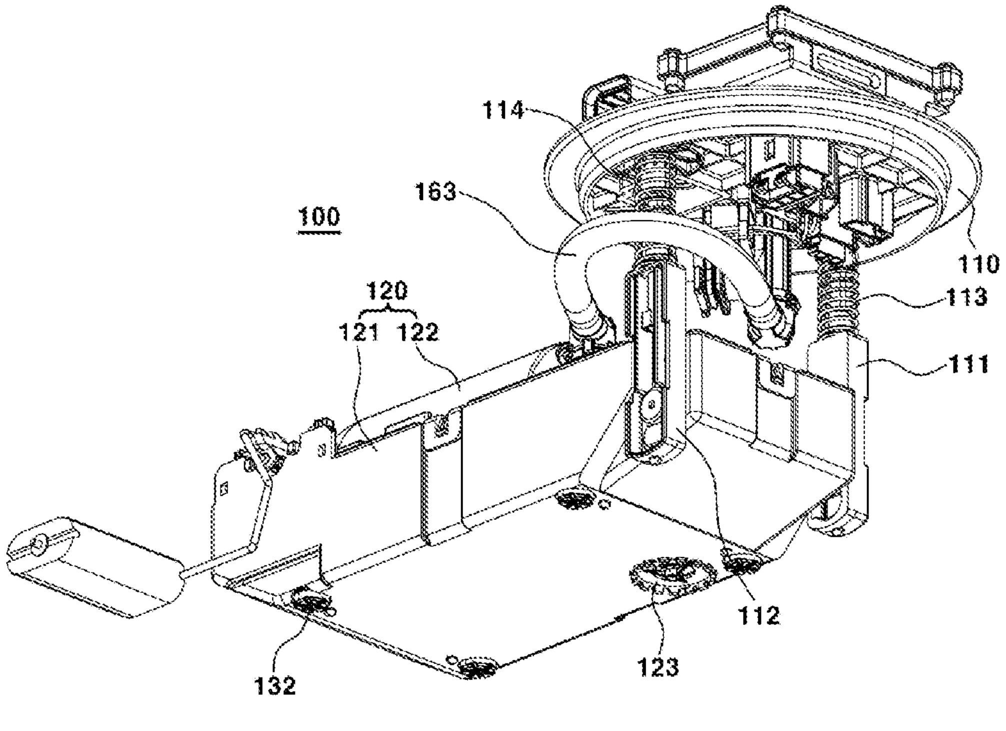

[FIG. 4]
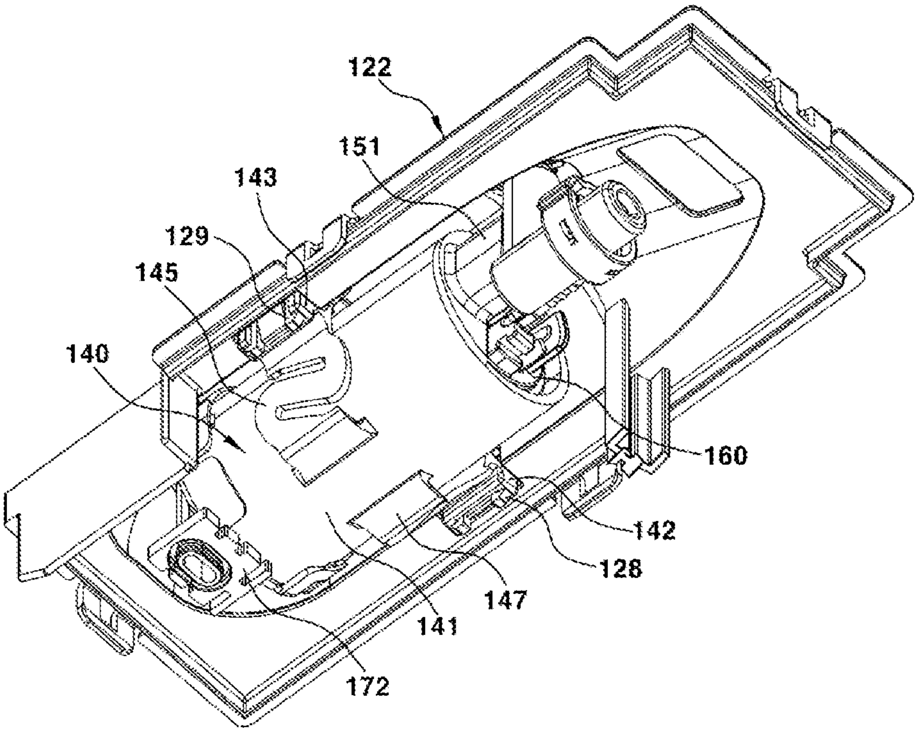

[FIG. 5]
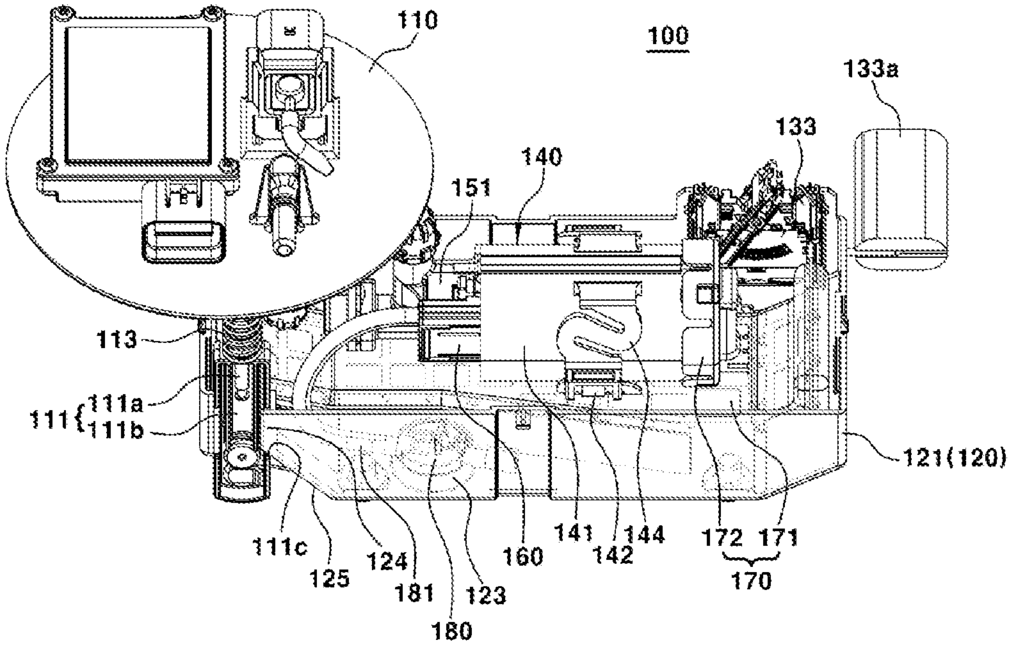
[FIG. 6]
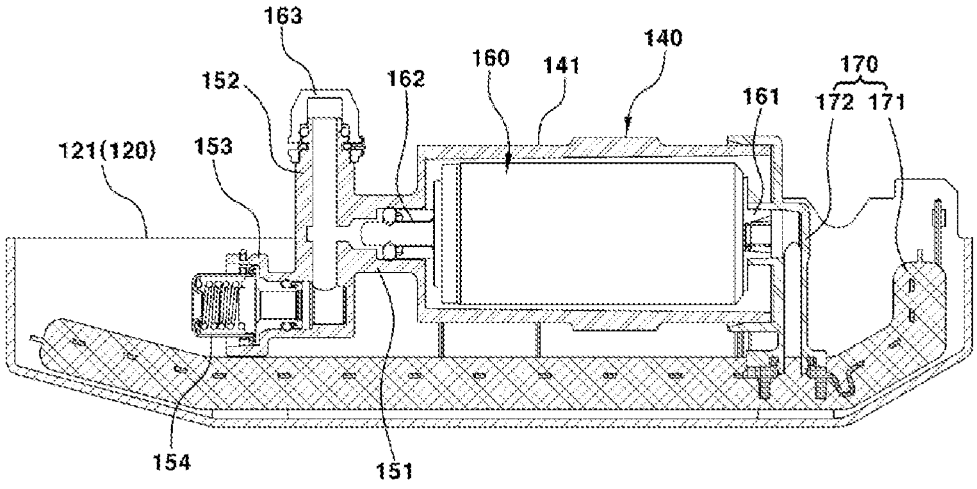

[FIG. 7]
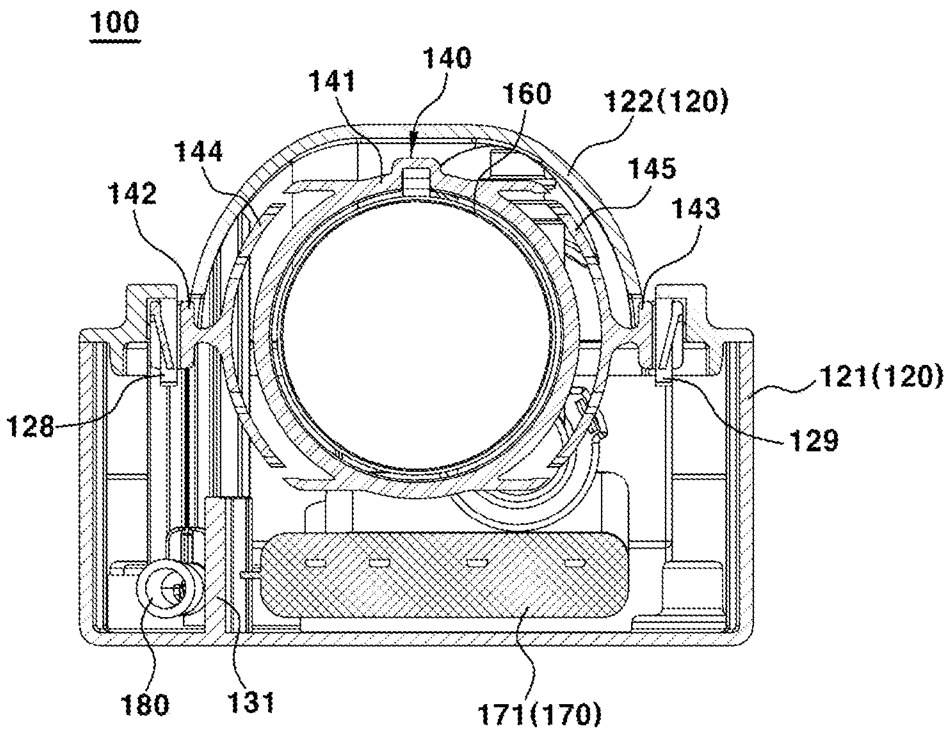

[FIG. 8]
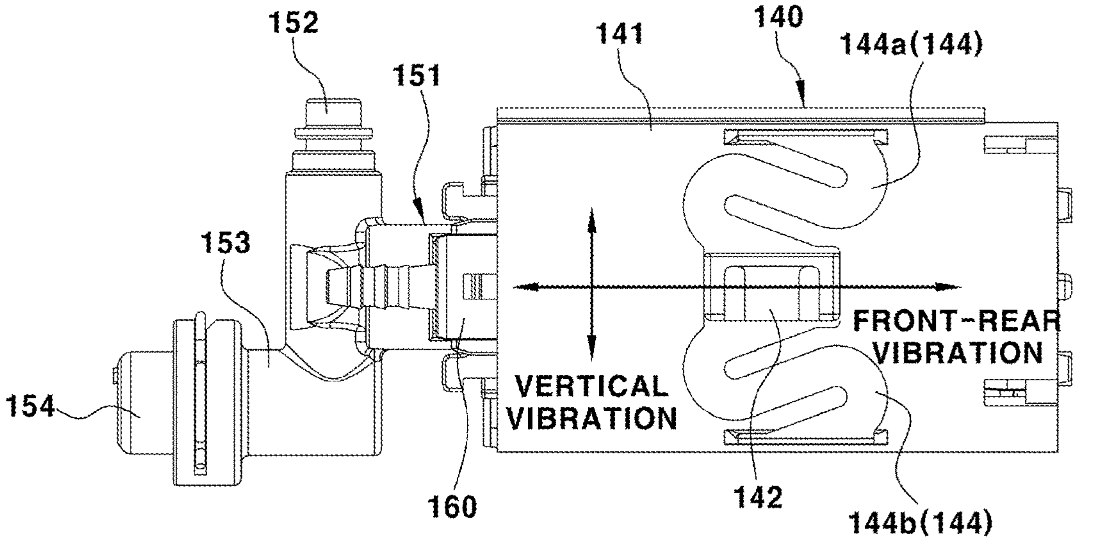

[FIG. 9]
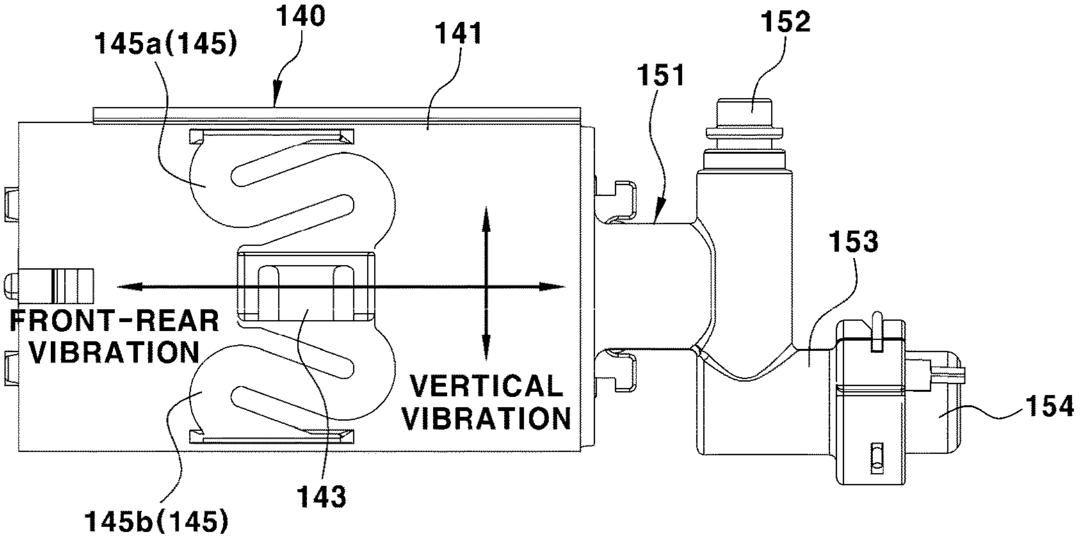
[FIG. 10]
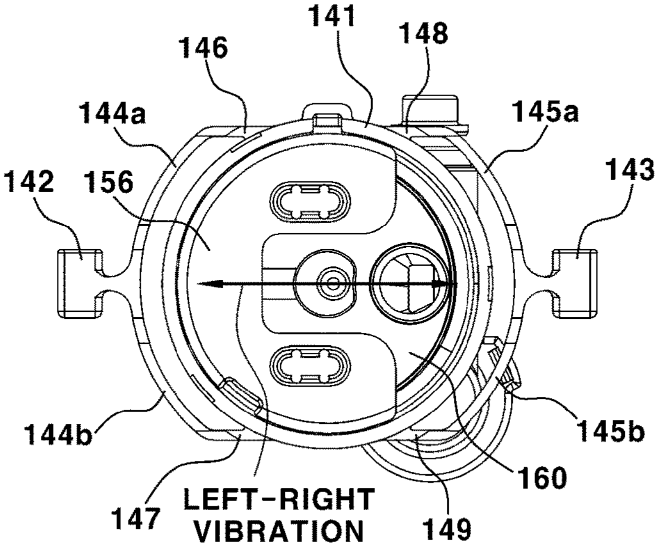

[FIG. 11]
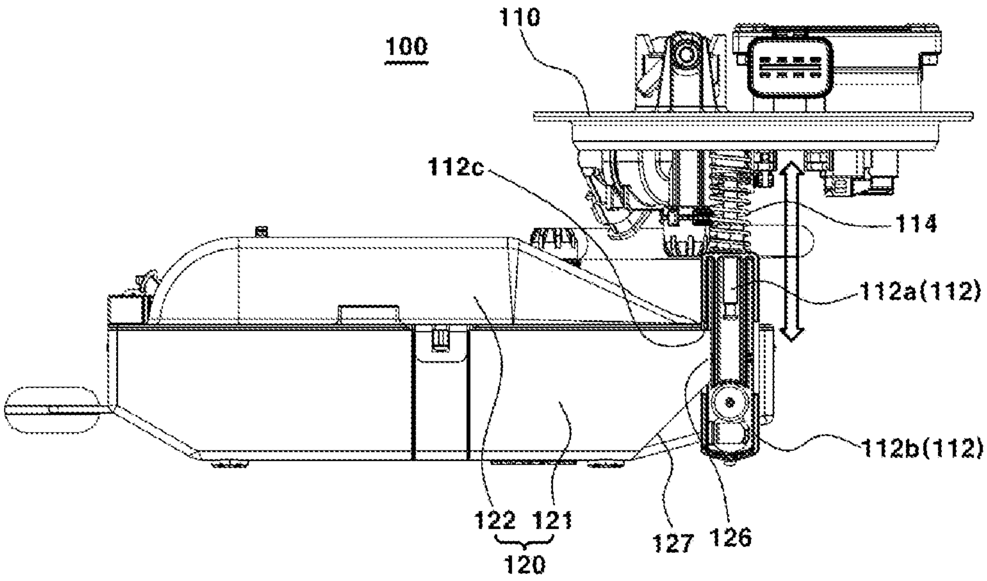
[FIG. 12]
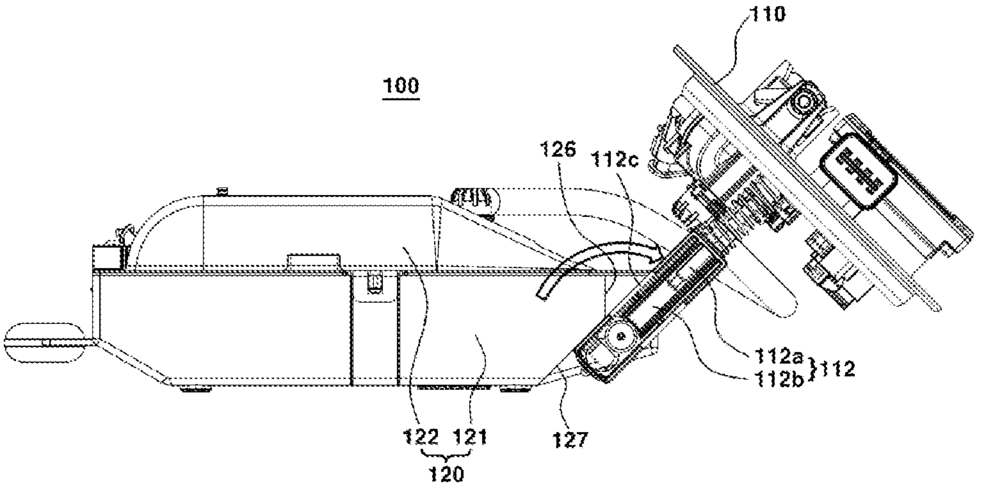

[FIG. 13]
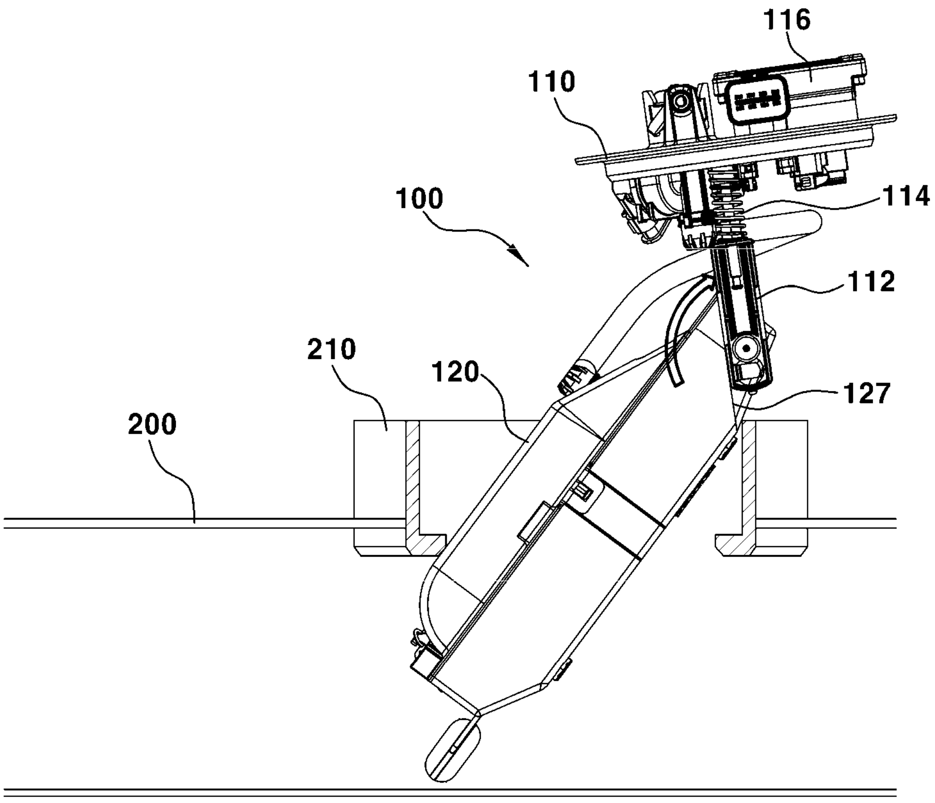
[ INSTALLING FUEL PUMP MODULE IN FUEL TANK ]
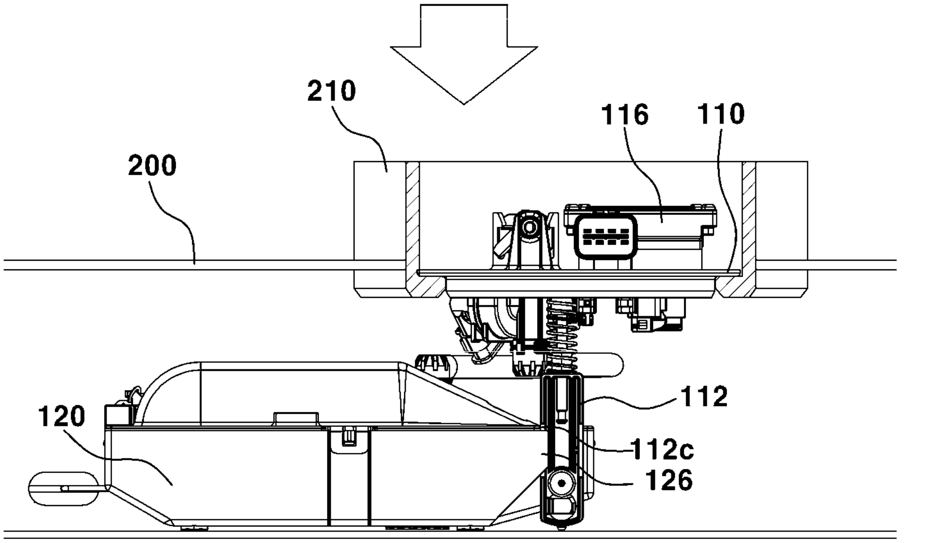
[ INSTALLATION OF FUEL PUMP MODULE IN FUEL TANK IS DONE ]

[FIG. 14]
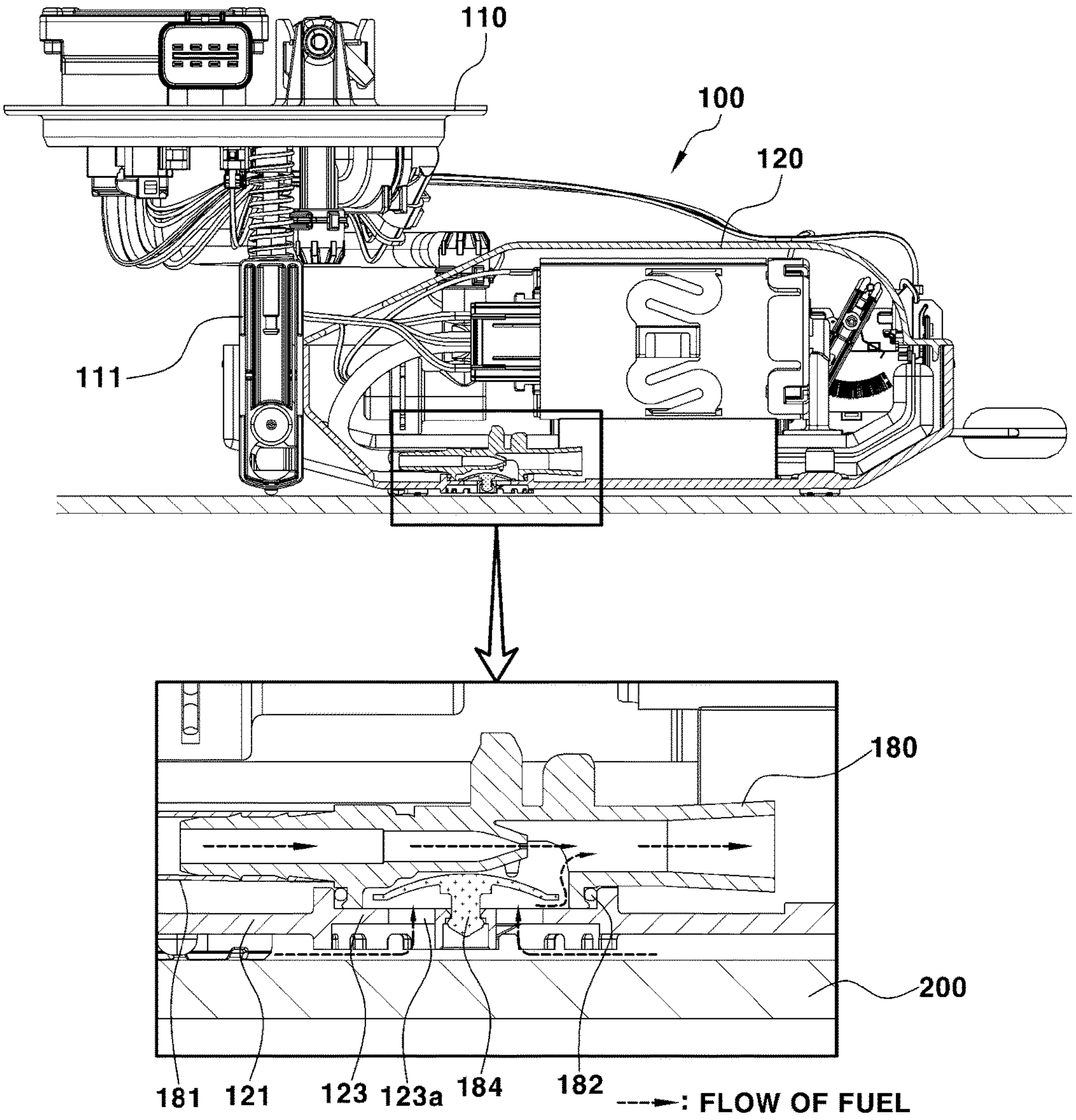

FUEL PUMP MODULE FOR VEHICLE

CROSS-REFERENCE TO RELATED APPLICATION

This application claims the benefit of priority under 35 U.S.C. § 119(a) to Korean Patent Application No. 10-2021-0110609 filed on Aug. 23, 2021, the entire contents of which are incorporated herein by reference.

TECHNICAL FIELD

The present disclosure relates to a fuel pump module for a vehicle, and more particularly, to a fuel pump module capable of being easily mounted on a low-floor type fuel tank having a reduced vertical height.

BACKGROUND

Recently, an underbody of a vehicle is being lowered to expand an interior space of the vehicle, achieve low centralization (e.g., a lower center of gravity), and improve the seating comfort of passengers. Accordingly, there is a trend that fuel tanks are flattened as low-floor type fuel tanks.

Generally, the fuel tank is disposed below the underbody of the vehicle, and a fuel pump module for pressure transferring fuel from the fuel tank to an engine is mounted in the fuel tank. Therefore, to reduce a height of the fuel tank, it is necessary to reduce a height of the fuel pump module as much as possible.

However, the existing fuel pump module has a limitation in reducing its height because the fuel pump is typically disposed in a vertically erected structure when in use, and thus it is impossible to install the existing fuel pump module in a low-floor type fuel tank.

Meanwhile, since a structure of the underbody is varies depending on a vehicle model, different fuel tanks are being developed and thus an investment cost is increased. Therefore, it is necessary to make the fuel tank common regardless of vehicle types.

RELATED ART DOCUMENT

Patent Document

Korean Patent Laid-Open Application No. 2018-0125207

SUMMARY

The present disclosure has been made in an effort to solve the above-described problems associated with prior art.

In one aspect, the present disclosure provides a fuel pump module for a vehicle, which is formed in a low-floor type fuel pump module capable of being installed in a fuel tank with a low vertical height.

In another aspect, the present disclosure provides a fuel pump module for a vehicle, which is capable of reducing a vibration and a noise which are generated during an operation of the fuel pump.

Objectives of the present disclosure are not limited to the above-described objectives, and other objectives of the present disclosure, which are not mentioned, can be understood by the following description and also will be apparently understood through embodiments of the present disclosure. Further, the objectives of the present disclosure can be implemented by means described in the appended claims and a combination thereof.

The present disclosure for achieving the above objectives includes the following configuration.

In an exemplary embodiment, the present disclosure provides a fuel pump module including a head plate to be mounted in an opening of a fuel tank, a reservoir cup to which the head plate is pivotably coupled through a pair of connecting bars and which is to be installed in the fuel tank in a state of being coupled to the head plate, a fuel pump disposed in the reservoir cup in a state of being laid and to deliver fuel in the reservoir cup to an outside of the fuel tank, and a jet pump installed in the reservoir cup and to suction fuel outside the reservoir cup and discharge the fuel into the reservoir cup by receiving a portion of the fuel delivered from the fuel pump as a working fluid.

According to embodiments of the present disclosure, the fuel pump module has the following features.

The reservoir cup may include a cup body to store the fuel and an upper cover coupled to the cup body so as to cover an upper surface of the cup body, and the fuel pump may be coupled to the upper cover through a retainer and disposed below the upper cover.

In addition, the retainer may include a retainer body in which the fuel pump is accommodated and fixed, a first fixing part coupled to one of a first hooking part and a second hooking part provided on both sides of a bottom portion of the upper cover, a second fixing part coupled to another of the first hooking part and the second hooking part and to support the retainer body together with the first fixing part while being disposed below the upper cover, a first vibration absorber to integrally connect the retainer body to the first fixing part and absorb a vibration of the fuel pump through elastic deformation, and a second vibration absorber to integrally connect the retainer body to the second fixing part and absorb the vibration of the fuel pump through elastic deformation.

In addition, the retainer body may be connected to the reservoir cup through only the first fixing part and the second fixing part. In addition, the retainer body may be coupled to the upper cover through the first fixing part and the second fixing part, thereby hovering in an inner space of the reservoir cup.

In addition, the first vibration absorber may include a first upper vibration absorber disposed above the first fixing part and a first lower vibration absorber disposed below the first fixing part, and each of the first upper vibration absorber and the first lower vibration absorber may have a structure that is bent two or more times while extending in a circumferential direction of the retainer body.

In addition, the first fixing part may be in a central portion of the first vibration absorber in a vertical direction and protrudes to a side opposite the retainer body, and the first upper vibration absorber and the first lower vibration absorber may be symmetrical to each other based on the first fixing part.

In addition, an upper end of the first upper vibration absorber may be disposed to be spaced apart from an outer circumferential surface of the retainer body through a first upper spacing portion in a horizontal direction, and a lower end of the first lower vibration absorber may be spaced apart from the outer peripheral surface of the retainer body through a first lower spacing portion in the horizontal direction.

In addition, the second vibration absorber may include a second upper vibration absorber disposed above the second fixing part and a second lower vibration absorber disposed below the second fixing part, and each of the second upper vibration absorber and the second lower vibration absorber may have a structure of being bent two or more times while extending in the circumferential direction of the retainer body.

In addition, the second fixing part may be in a central portion of the second vibration absorber in a vertical direction and protrude to a side opposite the retainer body, and the second upper vibration absorber and the second lower vibration absorber may be symmetrical to each other based on the second fixing part.

In addition, an upper end of the second upper vibration absorber may be disposed to be spaced apart from an outer circumferential surface of the retainer body through a second upper spacing portion in a horizontal direction, and a lower end of the second lower vibration absorber may be spaced apart from the outer peripheral surface of the retainer body through a second lower spacing portion in the horizontal direction.

In addition, the second vibration absorber may include a second upper vibration absorber disposed above the second fixing part and a second lower vibration absorber disposed below the second fixing part, and each of the second upper vibration absorber and the second lower vibration absorber may have a structure that is bent two or more times while extending in the circumferential direction of the retainer body.

In addition, the second fixing part may be in a central portion of the second vibration absorber in a vertical direction and protrude to a side opposite to the retainer body, and the second upper vibration absorber and the second lower vibration absorber may be symmetrical to each other based on the second fixing part.

In addition, an upper end of the second upper vibration absorber may be disposed to be spaced apart from the outer circumferential surface of the retainer body through a second upper spacing portion in the horizontal direction, and a lower end of the second lower vibration absorber may be spaced apart from the outer peripheral surface of the retainer body through a second lower spacing portion in the horizontal direction.

In addition, the first vibration absorber and the second vibration absorber may be symmetrical to each other based on the retainer body.

In addition, the reservoir cup may include an integrated filter disposed therein, and the integrated filter may include a filter body with a plate structure disposed on a bottom surface of the reservoir cup below the fuel pump and to filter the fuel suctioned into the fuel pump, and a filter connector to connect the filter body to an inlet of the fuel pump to allow the fuel to flow.

In addition, at least one connecting bar from the pair of connecting bars may include an upper connecting bar coupled and fixed to a lower surface of the head plate, and a lower connecting bar pivotably coupled to a side portion of the cup body, and the lower end of the upper connecting bar may be enterably inserted into and assembled to the upper end of the lower connecting bar.

In addition, a side surface of the cup body may include a hook portion, and the lower connecting bar may include an insertion hole into which the hook portion is insertable, and when the reservoir cup is seated on a bottom surface of the fuel tank and the head plate is coupled to the opening of the fuel tank the hook portion is inserted into the insertion hole to prevent the reservoir cup from being pivoted.

In addition, the fuel pump module may further include a spring member stacked and disposed between the head plate and the lower connecting bar, the spring member may be assembled to an outer side of the upper connecting bar.

Other aspects and preferred embodiments of the present disclosure are discussed infra.

It is understood that the term “vehicle” or “vehicular” or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the present disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIG. 1 is an assembled perspective view illustrating a fuel pump module according to an embodiment of the present disclosure;

FIG. 2 is an exploded perspective view illustrating the fuel pump module;

FIG. 3 is a bottom perspective view illustrating the fuel pump module of FIG. 1 when viewed from the bottom;

FIG. 4 is a bottom perspective view illustrating a retainer coupled to an upper cover among components of the fuel pump module;

FIG. 5 is a perspective view illustrating the components of the fuel pump module without the upper cover;

FIG. 6 is a cross-sectional view illustrating some components disposed in a cup body among the components of the fuel pump module;

FIG. 7 is a cross-sectional view taken along line A-A of FIG. 1;

FIGS. 8 to 10 are diagrams illustrating the retainer assembled with a fuel pump among the components of the fuel pump module;

FIGS. 11 and 12 are diagrams illustrating a connection structure between a head plate and a reservoir cup of the fuel pump module;

FIG. 13 is a diagram illustrating a process of mounting the fuel pump module on a fuel tank; and FIG. 14 is a diagram illustrating an operation structure of a jet pump among the components of the fuel pump module.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Throughout the present specification, when an element is referred to as “comprising” a component, it means that the component can further include other components, not excluding the other components unless specifically stated otherwise.

In addition, throughout the present specification, when a component is referred to as being "connected" to another component, it may be directly connected to another component, but it should be understood that still another component may be present between the component and another component. On the contrary, when a component is referred to as being "directly connected" to another component, it should be understood that still another component may not be present between the component and another component. Other expressions describing the relationship between components, that is, "between" and "immediately between," or "adjacent to" and "directly adjacent to" should also be construed as described above.

Further, in the present specification, the terms "first," "second," and the like are assigned to components so as to differentiate these components because names of the components are the same, but these terms do not limit the order of the components.

In addition, the terms "upper," "lower," "vertical," "horizontal," "bottom," and the like may describe features of the embodiments with reference to the positions of features as displayed in the figures.

The present disclosure relates to a fuel pump module for a vehicle, which is capable of being easily mounted on a low-floor type fuel tank having a low vertical height, and the fuel pump module is formed to be mounted inside a fuel tank and pump fuel stored in the fuel tank to supply the fuel to the outside. Specifically, the fuel pump module may pump fuel in a reservoir cup and deliver the fuel to an engine.

The fuel pump module of the present disclosure may have a structure of which a height in a vertical direction is reduced so as to be installed in a low-floor type fuel tank having a relatively low height and may be formed to have a flat exterior appearance occupying a large space in a lateral direction.

In addition, according to the present disclosure, in order to form a low-floor type fuel pump module, instead of a vertical structure in which a fuel pump, a reservoir cup, and a filter are vertically disposed, a horizontal structure laterally disposed in a fuel tank may be formed and applied.

In addition, the fuel pump module of the present disclosure is formed to be capable of preventing a high-frequency noise and a vibration of the fuel pump disposed in the reservoir cup from being transmitted, through a vehicle body, to a passenger seated on a seat above the fuel tank.

Hereinafter, embodiments of the present disclosure will be described with reference to the accompanying drawings. Items shown in the drawings are schematically illustrated so as to easily describe the exemplary embodiments of the present disclosure, and thus the items may be different from those actually implemented.

FIG. 1 is an assembled perspective view illustrating a fuel pump module according to an embodiment of the present disclosure, FIG. 2 is an exploded perspective view illustrating the fuel pump module, FIG. 3 is a bottom perspective view illustrating the fuel pump module of FIG. 1 when viewed from the bottom, FIG. 4 is a bottom perspective view illustrating a retainer coupled to an upper cover among components of the fuel pump module, FIG. 5 is a perspective view illustrating the components of the fuel pump module without the upper cover, FIG. 6 is a cross-sectional view illustrating some components disposed in a cup body among the components of the fuel pump module, FIG. 7 is a cross-sectional view taken along line A-A of FIG. 1, FIGS. 8 to 10 are diagrams illustrating the retainer assembled with a fuel pump among the components of the fuel pump module, FIGS. 11 and 12 are diagrams illustrating a connection structure between a head plate and a reservoir cup of the fuel pump module, FIG. 13 is a diagram illustrating a process of mounting the fuel pump module on a fuel tank, and FIG. 14 is a diagram illustrating an operation structure of a jet pump among the components of the fuel pump module.

As illustrated in FIGS. 1 to 5, a fuel pump module 100 of the present disclosure includes a head plate 110, a reservoir cup 120, a fuel pump 160, and a jet pump 180.

Referring to FIG. 13, the head plate 110 is mounted on an opening 210 of a fuel tank 200, and a controller 116 for controlling an operation of the fuel pump 160 is mounted on the head plate 110. The opening 210 for inserting and assembling the fuel pump module 100 is provided on an upper surface of the fuel tank 200 on which the fuel pump module 100 is mounted. In a state of being completely assembled, the fuel pump module 100 may be inserted into the fuel tank 200 through the opening 210 and located in the fuel tank 200. In this case, the reservoir cup 120 of the fuel pump module 100 is inserted into the fuel tank 200 and located in the fuel tank 200 in a state of being coupled to the head plate 110, and the head plate 110 is seated on the upper surface of the fuel tank 200 in a state of being coupled to the reservoir cup 120 to seal the opening 210.

In order to insert the reservoir cup 120 into the fuel tank 200 through the opening 210, the head plate 110 is pivotably coupled to the reservoir cup 120 through a pair of connecting bars 111 and 112.

In addition, in a state in which the reservoir cup 120 is inserted into the fuel tank 200, the head plate 110 may be mounted on and coupled to the opening 210 to seal the inside of the fuel tank 200. The head plate 110 serves to seal the opening 210 of the fuel tank 200 and support the reservoir cup 120 coupled to the head plate 110.

In addition to the controller 116 for controlling driving of the fuel pump 160, other components may be further provided on the head plate 110. For example, a pressure sensor 117 may be mounted on a lower surface of the head plate 110. The pressure sensor 117 may detect a pressure of fuel delivered from the fuel pump 160 to an engine.

In addition, a fuel hose 163 connected to an outlet 162 of the fuel tank 200 may discharge the fuel to the outside of the fuel tank 200 through the head plate 110. For example, the head plate 110 may have a hole structure for connecting the fuel hose 163 to a fuel supply line of the engine to allow the fuel to flow.

The reservoir cup 120 receives and stores the fuel from the fuel tank 200 and is inserted and installed in the fuel tank 200 in a state of being coupled to a lower portion of the head plate 110.

Referring to FIG. 14, the reservoir cup 120 receives the fuel from the fuel tank 200 through the jet pump 180 installed in the reservoir cup 120 and is filled with the fuel. The jet pump 180 may be installed to be disposed on a bottom portion of the reservoir cup 120.

The jet pump 180 is configured to suction fuel from the outside of the reservoir cup 120 (i.e., the fuel in the fuel tank 200) by receiving a portion of the fuel pressure-transferred from the fuel pump 160 as a working fluid and discharge the suctioned fuel into the inside of the reservoir cup 120.

The jet pump 180 may receive a portion of the fuel discharged from the fuel pump 160 through a jet hose 181. The jet hose 181 is connected to the fuel pump 160 separately from the fuel hose 163 to receive a portion of the fuel delivered from the fuel pump 160. The jet hose 181 provides the fuel supplied from the fuel pump 160 to a working fluid inlet of the jet pump 180.

As shown in FIG. 5, the jet pump 180 may be installed to be disposed in an inlet 123 formed on the bottom portion of the reservoir cup 120 and may be formed in a structure for performing the same function as a jet pump applied to a general fuel pump module. As shown in FIG. 14, an O-ring 182 pressed against the inlet 123 of the reservoir cup 120 may be mounted on a bottom portion of the jet pump 180. Also, a through-hole 123*a* for introducing fuel is provided in the inlet 123 of the reservoir cup 120, and the through-hole 123*a* is selectively opened by a check valve 184.

Since the reservoir cup 120 always maintains a fully filled condition through the jet pump 180, the fuel pump module 100 may secure stability of a fuel supply.

Referring to FIG. 13, in order to allow a height of the fuel pump module 100 in a vertical direction to be reduced, the reservoir cup 120 is formed in a structure of being horizontally laid down to be long on a bottom surface of the fuel tank 200.

In the present disclosure, in order to have a height that is lower than a height of the existing reservoir cup and secure a fuel storage space at a level of being equivalent to a fuel storage space of the existing reservoir cup, the reservoir cup 120 has a structure which is laterally extended. That is, the reservoir cup 120 may be formed to have a height that is lower than the height of the existing reservoir cup in the vertical direction and an area that is wider than an area thereof in a horizontal direction.

As shown in FIGS. 1 to 3, the reservoir cup 120 includes a cup body 121 in which the fuel is filled and stored, and an upper cover 122 coupled to the cup body 121 so as to cover an upper surface of the cup body 121.

As shown in FIGS. 6 and 7, the fuel pump 160 is disposed in a structure of being horizontally laid in the reservoir cup 120. The fuel pump 160 is configured to suction the fuel in the reservoir cup 120 and deliver the suctioned fuel to the outside of the fuel tank 200 through the fuel hose 163.

Since the fuel pump 160 is mounted in the structure of being horizontally laid in the reservoir cup 120, the height of the reservoir cup 120 and the height of the fuel pump module 100 may be reduced compared to the height of the existing reservoir cup. Thus, the fuel pump module 100 is capable of being applied to a low-floor type fuel tank.

The fuel pump 160 being horizontally mounted in the reservoir cup 120 means that a motor rotation shaft of the fuel pump 160 is mounted to be horizontally long in the reservoir cup 120.

In the embodiment of the present disclosure, the cup body 121 of the reservoir cup 120 is configured in the form of a container having an inner space filled with the fuel and is formed to allow the fuel pump 160 to be disposed in a horizontally laid structure.

The jet pump 180 may be installed in the inlet 123 formed on a bottom portion of the cup body 121. Accordingly, the inner space of the cup body 121 is filled with the fuel suctioned and then discharged from the fuel tank 200 by the jet pump 180.

In addition, the cup body 121 is fixedly installed in the fuel tank 200 and blocks a high frequency noise of the fuel pump 160 together with the upper cover 122. The cup body 121 may be installed on the bottom surface of the fuel tank 200 to be supported on a plurality of bumpers 132, and the cup body 121 may be disposed on the bottom surface of the fuel tank 200 in a state in which a bottom surface of the cup body 121 is supported on the bumpers 132.

In addition, a fuel sender 133 for detecting a remaining amount of the fuel in the fuel tank 200 may be integrally installed in the cup body 121. The fuel sender 133 may be a float type fuel gauge including a floater 133*a*. The floater 133*a* is coupled to the cup body 121 so as to be capable of flowing from the outside of the cup body 121 according to a height of the fuel in the fuel tank 200 and is used to detect a remaining amount of the fuel in the fuel tank 200.

In the embodiment of the present disclosure, the upper cover 122 may be configured in the form of a full cover which generally covers and seals the upper surface of the cup body 121. When the upper cover 122 in the form of a full cover is applied, it is possible to prevent the fuel in the reservoir cup 120 from overflowing upward due to a flow, and thus the fuel pump module 100 may secure stability of a fuel supply with respect to the engine.

The upper cover 122 in the form of a full cover may generally cover and seal the upper surface of the cup body 121, except for a hole for arranging the fuel hose 163. In addition, when the reservoir cup 120 is configured in the form of a closed structure by the upper cover 122, transmission of a high-frequency noise from the fuel pump 160 driven in the reservoir cup 120 to the outside of the reservoir cup 120 may be reduced.

In addition, a first hooking part 128 and a second hooking part 129 for fixing the retainer 140 are provided on both sides of the upper cover 122 in a width direction. The first hooking part 128 and the second hooking part 129 are provided to be disposed on both sides of a bottom portion of the upper cover 122 and may be formed to protrude downward from the bottom portion of the upper cover 122.

Here, the width direction of the upper cover 122 is a direction perpendicular to an axial direction of the retainer 140 coupled to the upper cover 122, and the axial direction of the retainer 140 is an axial direction of the fuel pump 160 which is fixed in a state of being accommodated in the retainer 140.

As shown in FIG. 7, in the state of being accommodated in the retainer 140, the fuel pump 160 is mounted in a space surrounded by the upper cover 122 and the cup body 121, that is, the inside of the reservoir cup 120. As shown in FIG. 4, the fuel pump 160 is coupled to be fixed to the upper cover 122 through the retainer 140 and disposed below the upper cover 122. The fuel pump 160 coupled to the upper cover 122 through the retainer 140 is spaced a predetermined distance from the bottom surface of the cup body 121. In order to implement the above coupling structure, a central portion of the upper cover 122 may be formed in a structure which is convexly raised upward along the shape of the fuel pump 160.

As shown in FIGS. 6 to 10, the retainer 140 may include a retainer body 141, a pair of fixing parts 142 and 143, and a pair of vibration absorbers 144 and 145.

The retainer body 141 is a portion in which the fuel pump 160 is accommodated and fixed, and the fuel pump 160 may be inserted and accommodated in the retainer body 141 in an axial direction. The retainer body 141 may be formed in a cylindrical structure, a filter connector 172 may be coupled to a front end of the retainer body 141 in the axial direction, and a fuel delivery part 151 may be provided on a rear end of the filter connector 172 in the axial direction.

A front end portion of the filter connector 172 is coupled to the filter body 171 of the integrated filter 170, and a rear end portion thereof is coupled to the front end of the retainer body 141. The filter connector 172 is configured such that the rear end portion is coupled to the front end of the retainer body 141 and connected to an inlet 161 of the fuel pump

160, and the filter connector 172 may be directly connected to the inlet 161 of the fuel pump 160 to allow the fuel to flow.

The filter connector 172 may provide a suction path for fuel suctioned into the fuel pump 160 due to a suction force generated when the fuel pump 160 is driven. The fuel suctioned into the fuel pump 160 passes through the filter body 171 to allow foreign materials to be removed.

As shown in FIG. 6, the fuel delivery part 151 is configured such that the outlet 162 of the fuel pump 160 may be airtightly inserted and accommodated in the fuel delivery part 151, and the fuel discharged through the outlet 162 of the fuel pump 160 may be delivered to the outside of the reservoir cup 120. The fuel delivery part 151 may include a hose connector 152 and a regulator mounting portion 153.

The hose connector 152 may be airtightly coupled to the fuel hose 163 connected to the head plate 110, and the fuel discharged from the fuel pump 160 may be delivered to the outside of the fuel tank 200 through the fuel hose 163.

The fuel hose 163 connected to the outlet 162 of the fuel pump 160 through the fuel delivery part 151 may be connected to the head plate 110, and the fuel discharged from the fuel hose 163 may be delivered to the engine outside the fuel tank 200 through the head plate 110. The head plate 110 may have a pipe structure connected to the fuel hose 163 to allow the fuel to flow. The head plate 110 may be connected to the fuel supply line of the engine through the above pipe structure.

The regulator mounting portion 153 is equipped with a regulator 154 for maintaining a pressure of the fuel delivered to the outside through the fuel delivery part 151 to be less than a predetermined critical pressure.

When the pressure of the fuel discharged from the fuel pump 160 reaches the critical pressure, the regulator 154 opens the regulator mounting portion 153 to maintain the pressure of the fuel delivered to the outside through the fuel delivery part 151 to be less than the critical pressure. When the pressure of the fuel discharged from the fuel pump 160 is less than the critical pressure, the regulator 154 operates to close the regulator mounting portion 153.

When the fuel pump 160 is assembled in the retainer body 141, the fuel pump 160 may be airtightly assembled through a rubber mount 156. The rubber mount 156 may be disposed between the fuel pump 160 and the filter connector 172. The rubber mount 156 may remove a gap between the fuel pump 160 and the filter connector 172, thereby reducing a vibration of the fuel pump 160.

As shown in FIGS. 4 and 7, the first and second fixing parts 142 and 143 of the retainer 140 are coupled to be fixed to the first and second hooking parts 128 and 129 of the upper cover 122. The first fixing part 142 is coupled to the first hooking part 128, and the second fixing part 143 is coupled to the second hooking part 129. The first fixing part 142 and the second fixing part 143 are provided on both sides of the retainer body 141 in the width direction. The first fixing part 142 and the second fixing part 143 may be located to be opposite to each other while being symmetrical with each other based on the fuel pump 160 accommodated in the retainer body 141.

The retainer body 141, which is coupled to the upper cover 122 through the fixing parts 142 and 143, is disposed below the raised central portion of the upper cover 122 and spaced apart from the raised central portion of the upper cover 122 by a predetermined distance.

In other words, the fixing parts 142 and 143 are coupled to the hooking parts 128 and 129 of the upper cover 122 to support the retainer body 141 in the form of being spaced apart from a lower side of the upper cover 122.

The fixing parts 142 and 143 are integrally connected to the retainer body 141 through the vibration absorbers 144 and 145. The first vibration absorber 144 integrally connects the first fixing part 142 to the retainer body 141, and the second vibration absorber 145 is disposed on a side opposite to the first vibration absorber 144 to integrally connect the second fixing part 143 to the retainer body 141.

In the embodiment of the present disclosure, the retainer body 141 accommodating the fuel pump 160 is connected to the reservoir cup 120 through only the fixing parts 142 and 143. As shown in FIG. 7, the retainer body 141 may be supported in the form of being hung on the hooking parts 128 and 129 of the upper cover 122 through the fixing parts 142 and 143 to be floated in the inner space of the reservoir cup 120. In this case, the retainer body 141 is disposed in the reservoir cup 120 to be spaced a predetermined distance from the lower surface of the upper cover 122 and disposed a predetermined distance from the bottom surface of the cup body 121. With the above connection structure, it is possible to minimize transmission of a vibration of the fuel pump 160 to the reservoir cup 120 and the fuel tank 200.

As shown in FIGS. 8 to 10, the vibration absorbers 144 and 145 are configured to absorb the vibration of the fuel pump 160 through elastic deformation of the vibration absorbers 144 and 145. When the fuel pump 160 is driven, vibrations may occur in all directions including a vertical direction, a front-rear direction, and a left-right direction. In order to prevent the vibration of the fuel pump 160 from being transmitted to the fixing parts 142 and 143 of the retainer 140 coupled to the hooking parts 128 and 129 of the reservoir cup 120, the vibration absorbers 144 and 145 are configured in a spring structure capable of absorbing vibrations in all directions. The vibration absorbers 144 and 145 absorb the vibrations of the fuel pump 160 so that it is possible to prevent transmission of the vibrations to passengers seated on seats of the vehicle.

Here, the vertical vibration of the fuel pump 160 refers to a perpendicular vibration of the fuel pump 160, the front-rear vibration of the fuel pump 160 refers to an axial vibration of the fuel pump 160, and the left-right vibration of the fuel pump 160 refers to a width vibration of the fuel pump 160 (i.e., a radial vibration).

The vibration absorbers 144 and 145 are configured to be elastically deformed in the vertical direction, the left-right direction, and the front-rear direction, thereby absorbing the vibrations of the fuel pump 160 in all directions.

The first vibration absorber 144 may include a first upper vibration absorber **144*a* and a first lower vibration absorber 144*b*, each having a structure of being curved two or more times while extending in a circumferential direction of the retainer body 141. In the embodiment of the present disclosure, each of the first upper vibration absorber 144*a* and the first lower vibration absorber 144*b* may be formed in an S-shaped curved structure extending in the circumferential direction of the retainer body 141, and when the fuel pump 160 is driven, the vibration of the fuel pump 160 may be absorbed through elastic deformation of the first upper vibration absorber 144*a* and the first lower vibration absorber 144*b***.

The first vibration absorber 144 is disposed to be long in the circumferential direction of the retainer body 141, and the first fixing part 142 is provided in the form protruding from a central portion of the first vibration absorber 144 in the vertical direction. In this case, the first fixing part 142 is formed to protrude to a side opposite to the retainer body 141 and disposed at a position between the first upper vibration absorber 144*a* and the first lower vibration absorber 144*b*.

The first upper vibration absorber 144*a* and the first lower vibration absorber 144*b* may be disposed in the form of being declined at a predetermined angle with respect to the vertical direction and may be formed to be symmetrical to each other based on the first fixing part 142. The first upper vibration absorber 144*a* is disposed above the first fixing part 142, and the first lower vibration absorber 144*b* is disposed below the first fixing part 142.

In addition, the first vibration absorber 144 is disposed to be spaced apart from an outer circumferential surface of the retainer body 141 in the horizontal direction through the first upper spacing portion 146 and the first lower spacing portion 147. The first upper spacing portion 146 separates an upper end of the first vibration absorber 144 (that is, an upper end of the first upper vibration absorber 144*a*) at a predetermined distance from the outer circumferential surface of the retainer body 141 in the horizontal direction, and the first lower spacing portion 147 separates a lower end of the first vibration absorber 144 (that is, a lower end of the first lower vibration absorber 144*b*) at a predetermined distance from the outer circumferential surface of the retainer body 141 in the horizontal direction.

The second vibration absorber 145 may be formed in the same structure as the first vibration absorber 144 and may be configured to be symmetrical to the first vibration absorber 144 based on the retainer body 141 accommodating the fuel pump 160. In order to secure an elastic restoring force, it is preferable that the first vibration absorber 144 and the second vibration absorber 145 are configured to form a symmetry to each other based on the retainer body 141.

In the embodiment of the present disclosure, the second vibration absorber 145 may include a second upper vibration absorber 145*a* and a second lower vibration absorber 145*b*, each having a structure of being curved two or more times while extending in the circumferential direction of the retainer body 141. Each of the second upper vibration absorber 145*a* and the second lower vibration absorber 145*b* may be formed in an S-shaped curved structure extending in the circumferential direction of the retainer body 141, and when the fuel pump 160 is driven, the vibration of the fuel pump 160 may be absorbed through elastic deformation of the second upper vibration absorber 145*a* and the second lower vibration absorber 145*b*.

The second vibration absorber 145 is disposed to be long in the circumferential direction of the retainer body 141, and the second fixing part 143 is provided in the form protruding from a central portion of the second vibration absorber 145 in the vertical direction. The second fixing part 143 is formed to protrude to a side opposite to the retainer body 141 and disposed at a position between the second upper vibration absorber 145*a* and the second lower vibration absorber 145*b*.

The second upper vibration absorber 145*a* and the second lower vibration absorber 145*b* may be disposed in the form of being declined at a predetermined angle with respect to the vertical direction and may be formed to be symmetrical to each other based on the second fixing part 143. The second upper vibration absorber 145*a* is disposed above the second fixing part 143, and the second lower vibration absorber 145*b* is disposed below the second fixing part 143.

In addition, the second vibration absorber 145 is disposed to be spaced apart from the outer circumferential surface of the retainer body 141 in the horizontal direction through the second upper spacing portion 148 and the second lower spacing portion 149. The second upper spacing portion 148 separates an upper end of the second vibration absorber 145 (that is, an upper end of the second upper vibration absorber 145*a*) at a predetermined distance from the outer circumferential surface of the retainer body 141 in the horizontal direction, and the second lower spacing portion 149 separates a lower end of the second vibration absorber 145 (that is, a lower end of the second lower vibration absorber 145*b*) at a predetermined distance from the outer circumferential surface of the retainer body 141 in the horizontal direction.

The first vibration absorber 144 and the second vibration absorber 145 are elastically deformed due to the vibration of the fuel pump 160 and absorb the vibration of the fuel pump 160 so that it is possible to prevent the vibration of the fuel pump 160 from being transmitted, through the fixing parts 142 and 143, to the reservoir cup 120.

In the fuel pump module 100 of the present disclosure, the vibrations of the fuel pump 160 in all directions may be absorbed through the vibration absorbers 144 and 145, each having a simplified structure as described above, thereby increasing space utilization of the fuel pump module 100.

As shown in FIGS. 5 to 7, the fuel pump module 100 of the present disclosure includes the integrated filter 170 disposed in the reservoir cup 120 in the form of being horizontally laid to be long below the fuel pump 160. The integrated filter 170 includes a filter body 171 for filtering out foreign materials in the fuel and a filter connector 172 for connecting the filter body 171 to the fuel pump 160.

The filter body 171 is configured to serve as two filters applied to the existing fuel pump. The filter body 171 is configured to secure the performance of filtering and collecting the foreign materials in the fuel and minimize a pressure loss of the fuel introduced into the fuel pump 160. Accordingly, it is possible to reduce the number of parts and achieve miniaturization and reduction in production cost by applying the integrated filter 170 to the fuel pump module 100 of the present disclosure.

In the embodiment of the present disclosure, the filter body 171 filters the fuel suctioned into the fuel pump 160 and may be disposed on the bottom surface of the reservoir cup 120. The filter body 171 may be formed in a plate shape having a predetermined vertical thickness and a predetermined horizontal area and may be widely disposed on the bottom surface of the cup body 121. In this case, the filter body 171 may formed in a plate structure bent along a shape of the bottom surface of the cup body 121.

The filter body 171 may be disposed on the bottom surface of the cup body 121 to be spaced a predetermined distance from a lower outer circumferential surface of the retainer body 141 coupled to the upper cover 122. Accordingly, the fuel pump 160 inserted into the retainer body 141 may be disposed to be spaced apart from above the filter body 171.

In the embodiment of the present disclosure, the filter body 171 may be formed in a structure in which a polypropylene non-woven fabric is stacked in multiple layers. For example, the filter body 171 may be formed in a structure in which a non-woven fabric is stacked in eight layers. The filter body 171 is formed in a multi-layer filtration structure to deeply filter foreign materials.

The filter body 171 may be connected to the inlet 161 of the fuel pump 160 through the filter connector 172 to allow the fuel to flow. In this case, one side portion of the retainer 140 (specifically, one side portion of the regulator mounting portion 153) may be seated on an upper surface of the filter body 171.

In addition, a partition wall (see 131 of FIGS. 5 and 7) for limiting a position of the filter body 171 may be provided on the bottom surface of the cup body 121. The partition wall 131 may protrude upward from the bottom surface of the cup body 121 and may prevent the filter body 171 from moving toward the jet pump 180.

Meanwhile, as shown in FIGS. 5 and 11 to 13, the pair of connecting bars 111 and 112 for connecting the head plate 110 to the reservoir cup 120 are formed such that upper end portions are coupled and fixed to the lower surface of the head plate 110 and lower end portions are pivotably coupled to a side surface of the cup body 121.

In the embodiment of the present disclosure, the pair of connecting bars 111 and 112 include a first connecting bar 111 and a second connecting bar 112, and the first connecting bar 111 and the second connecting bar 112 may include upper connecting bars 111*a* and 112*a* and lower connecting bars 111*b* and 112*b* which are coupled to be vertically changeable in length. The first connecting bar 111 may include a first upper connecting bar 111*a* and a first lower connecting bar 111*b*, and the second connecting bar 112 may include a second upper connecting bar 112*a* and a second lower connecting bar 112*b*.

Upper end portions of the upper connecting bars 111*a* and 112*a* are coupled to be fixed to the bottom portion of the head plate 110, and lower end portions of the lower connecting bars 111*b* and 112*b* are rotatably coupled to the side portion of the cup body 121. The lower end portion of the first lower connecting bar 111*b* may be hinge-coupled to a first side portion of the cup body 121, and the lower end of the second lower connecting bar 112*b* may be hinge-coupled a second side portion of the cup body 121. The first side portion and the second side portion of the cup body 121 are side portions opposite to each other.

In this case, in order to allow the reservoir cup 120 to be easily inserted into the fuel tank 200, the first lower connecting bar 111*b* and the second lower connecting bar 112*b* may be hinge-coupled to a rear side portion of the side portion of the cup body 121. In the embodiment of the present disclosure, the rear portion of the side portion of the cup body 121 is an area adjacent to the outlet 162 of the fuel pump 160. The inlet 161 of the fuel pump 160 is disposed in an area adjacent to a front side portion of the side portion of the cup body 121.

In addition, lower end portions of the upper connecting bars 111*a* and 112*a* are vertically movably inserted into and assembled to upper end portions of the lower connecting bars 111*b* and 112*b*. Due to the above assembly structure, vertical lengths of the connecting bars 111 and 112 may be varied. For example, when the reservoir cup 120 is inserted into the fuel tank 200, the lengths of the connecting bars 111 and 112 are varied so that the reservoir cup 120 may be easily inserted into the fuel tank 200. In addition, when the fuel tank 200 expands, vertical lengths of the connecting bars 111 and 112 may be increased as the upper connecting bars 111*a* and 112*a* are moved upward.

As shown in FIGS. 12 and 13, when the reservoir cup 120 is inserted into the fuel tank 200 through the opening 210 of the fuel tank 200, the connecting bars 111 and 112 allow the head plate 110 to be pivotable with respect to the reservoir cup 120 so that the reservoir cup 120 may be easily inserted into the fuel tank 200.

In this case, in order to limit a pivot angle of the head plate 110, a first inclined surface 125 for limiting a pivot angle of the first connecting bar 111 may be provided on the first side portion of the cup body 121, and a second inclined surface 127 for limiting a pivot angle of the second connecting bar 112 may be provided on the second side portion of the cup body 121. The first connecting bar 111 may be pivoted until coming into contact with the first inclined surface 125 and being hooked thereto, and the second connecting bar 112 may be pivoted until coming into contact with the second inclined surface 127 and being hooked thereto.

In addition, in order to prevent the reservoir cup 120 from being pivoted after being mounted in the fuel tank 200, a first insertion hole 111*c* may be provided in the first lower connecting bar 111*b*, a second insertion hole 112*c* may be provided in the second lower connecting bar 112*b*, a first hook portion 124 inserted into the first insertion hole 111*c* may be provided on the first side portion of the cup body 121, and a second hook portion 126 inserted into the second insertion hole 112*c* may be provided on the second side portion of the cup body 121. The hook portions 124 and 126 may be provided to be adjacent to the inclined surface portions 125 and 127 of the cup body 121.

When the reservoir cup 120 is seated on the bottom surface of the fuel tank 200 and the head plate 110 is coupled to the opening 210 of the fuel tank 200, since the hook portions 124 and 126 of the cup body 121 are inserted into the insertion holes 111*c* and 112*c* of the connecting bars 111 and 112, one side portion of the reservoir cup 120 may be prevented from being lifted and pivoted due to a flow of the fuel after the above insertion.

In addition, spring members 113 and 114 for absorbing a vibration of the fuel tank 200 may be disposed between the head plate 110 and the connecting bars 111 and 112. In a state of being assembled to an outer side of the first upper connecting bar 111*a*, the first spring member 113 may be stacked and disposed between the bottom portion of the head plate 110 and the upper end of the first lower connecting bar 111*b*, and in a state of being assembled to an outer side of the second upper connecting bar 112*a*, the second spring member 114 may be stacked and disposed between the bottom portion of the head plate 110 and the upper end of the second lower connecting bar 112*b*. In the embodiment of the present disclosure, upper ends of the spring members 113 and 114 may be supported in a state of being in contact with the lower portion of the head plate 110, and lower ends of the spring members 113 and 114 may be supported in a state of being in contact with the upper ends of the lower connecting bars 111*b* and 112*b*.

The spring members 113 and 114 may be elastically deformed to absorb the vibration of the fuel tank 200, thereby protecting the fuel pump module 100. The spring members 113 and 114 may be compressed and deformed to absorb an impact and a vibration transmitted to the head plate 110 through the fuel tank 200. The spring members 113 and 114 may protect the fuel pump module 100 from an external impact.

The fuel pump module 100 of the present disclosure, which is configured as described above, may be mounted on a low-floor type fuel tank with a low height and may be installed in and used to fuel tanks of all types of vehicles by varying only the lengths of the upper connecting bars 111*a* and 112*a* and the spring members 113 and 114.

The fuel pump module of the present disclosure provides the following effects through the above-described problem solving means.

First, since a head plate is coupled to a low-floor type reservoir cup in a rotatable and recoverable structure through a connecting bar, the fuel pump module can be easily installed in a low-floor type fuel tank with a reduced vertical height. In addition, as a fuel tank is lowered, it is possible to lower an underbody of a vehicle, expand an interior space, and improve seating comfort.

Second, by configuring a structure which effectively absorbs a vibration and a noise generated when a fuel pump is driven, it is possible to prevent the vibration and the noise from being transmitted to a passenger seated on a seat in the vehicle.

Third, by varying only a length of a connecting bar connecting the head plate to a reservoir cup, the fuel pump module can be commonly used for fuel tanks of all types of vehicles.

Although the embodiments of the present disclosure have been described in detail, the terms or words used in the specification and the appended claims should not be construed as being limited to ordinary or dictionary meanings, and the scope of the prevent disclosure is not limited to these embodiments, and various modifications and improvements devised by those skilled in the art using the fundamental concept of the present disclosure, which is defined by the appended claims, further fall within the scope of the present disclosure.

What is claimed is:

1. A fuel pump module for a vehicle, comprising:

a head plate to be mounted in an opening of a fuel tank;

a reservoir cup to which the head plate is pivotably coupled through a pair of connecting bars and which is to be installed in the fuel tank in a state of being coupled to the head plate; and a fuel pump disposed in the reservoir cup in a state of being laid and to deliver fuel in the reservoir cup to an outside of the fuel tank, wherein:

the reservoir cup includes a cup body to store the fuel and an upper cover coupled to the cup body so as to cover an upper surface of the cup body; and the fuel pump is coupled to the upper cover through a retainer to be supported in the form of being hung on the upper cover, thereby disposed below the upper cover and floated in an inner space of the reservoir cup.

2. The fuel pump module of claim 1, wherein the reservoir cup includes an integrated filter disposed therein, and the integrated filter includes:

a filter body with a plate structure disposed on a bottom surface of the reservoir cup below the fuel pump and to filter the fuel suctioned into the fuel pump; and a filter connector to connect the filter body to an inlet of the fuel pump to allow the fuel to flow.

3. The fuel pump module of claim 1, further comprising a jet pump installed in the reservoir cup and to suction fuel outside the reservoir cup and discharge the fuel into the reservoir cup by receiving a portion of the fuel delivered from the fuel pump as a working fluid.

4. The fuel pump module of claim 1, wherein the retainer includes:

a retainer body in which the fuel pump is accommodated and fixed;

a first fixing part coupled to one of a first hooking part and a second hooking part provided on both sides of a bottom portion of the upper cover;

a second fixing part coupled to another of the first hooking part and the second hooking part and to support the retainer body together with the first fixing part while being disposed below the upper cover;

a first vibration absorber to integrally connect the retainer body to the first fixing part and absorb a vibration of the fuel pump through elastic deformation; and a second vibration absorber to integrally connect the retainer body to the second fixing part and absorb the vibration of the fuel pump through elastic deformation.

5. The fuel pump module of claim 4, wherein the retainer body is connected to the reservoir cup through only the first fixing part and the second fixing part.

6. The fuel pump module of claim 4, wherein the retainer body is coupled to the upper cover through the first fixing part and the second fixing part, thereby hovering in an inner space of the reservoir cup.

7. The fuel pump module of claim 4, wherein:

the first vibration absorber includes a first upper vibration absorber disposed above the first fixing part and a first lower vibration absorber disposed below the first fixing part; and each of the first upper vibration absorber and the first lower vibration absorber has a structure that is bent two or more times while extending in a circumferential direction of the retainer body.

8. The fuel pump module of claim 7, wherein:

the first fixing part is in a central portion of the first vibration absorber in a vertical direction and protrudes to a side opposite the retainer body; and the first upper vibration absorber and the first lower vibration absorber are symmetrical to each other based on the first fixing part.

9. The fuel pump module of claim 7, wherein:

an upper end of the first upper vibration absorber is disposed to be spaced apart from an outer circumferential surface of the retainer body through a first upper spacing portion in a horizontal direction; and a lower end of the first lower vibration absorber is spaced apart from the outer peripheral surface of the retainer body through a first lower spacing portion in the horizontal direction.

10. The fuel pump module of claim 4, wherein:

the second vibration absorber includes a second upper vibration absorber disposed above the second fixing part and a second lower vibration absorber disposed below the second fixing part; and each of the second upper vibration absorber and the second lower vibration absorber has a structure that is bent two or more times while extending in the circumferential direction of the retainer body.

11. The fuel pump module of claim 10, wherein:

the second fixing part is in a central portion of the second vibration absorber in a vertical direction and protrude to a side opposite the retainer body; and the second upper vibration absorber and the second lower vibration absorber are symmetrical to each other based on the second fixing part.

12. The fuel pump module of claim 10, wherein:

an upper end of the second upper vibration absorber is disposed to be spaced apart from an outer circumferential surface of the retainer body through a second upper spacing portion in a horizontal direction; and a lower end of the second lower vibration absorber is spaced apart from the outer peripheral surface of the retainer body through a second lower spacing portion in the horizontal direction.

13. The fuel pump module of claim 4, wherein the first vibration absorber and the second vibration absorber are symmetrical to each other based on the retainer body.

14. The fuel pump module of claim 1, wherein at least one connecting bar from the pair of connecting bars includes:

an upper connecting bar coupled and fixed to a lower surface of the head plate; and a lower connecting bar pivotably coupled to a side portion of the cup body, wherein a lower end portion of the upper connecting bar is movably inserted into an upper end portion of the lower connecting bar in the vertical direction and assembled to the upper end portion thereof.

15. The fuel pump module of claim 14, wherein:

a side surface of the cup body includes a hook portion, and the lower connecting bar includes an insertion hole into which the hook portion is insertable; and when the reservoir cup is seated on a bottom surface of the fuel tank and the head plate is coupled to the opening of the fuel tank, the hook portion is inserted into the insertion hole to prevent the reservoir cup from being pivoted.

16. The fuel pump module of claim 14, further comprising a spring member stacked and disposed between the head plate and the lower connecting bar, the spring member is assembled to an outer side of the upper connecting bar.

* * * * *